United States Patent [19]
Ueda et al.

[11] Patent Number: 4,558,717
[45] Date of Patent: Dec. 17, 1985

[54] STEERING CONTROL VALVE SYSTEM FOR CRAWLER VEHICLE

[75] Inventors: Hiroshi Ueda; Takeshi Matsumoto; Masami Hashimoto, all of Hirakata, Japan

[73] Assignee: Kabushiki Kaisha Komatsu Seisakusho, Tokyo, Japan

[21] Appl. No.: 582,216

[22] Filed: Feb. 21, 1984

[30] Foreign Application Priority Data

Feb. 21, 1983 [JP] Japan .................................. 58-026334

[51] Int. Cl.⁴ ............................................. F15B 13/06
[52] U.S. Cl. ................................. 137/596; 137/637.2; 192/12 C; 192/13 R
[58] Field of Search ............................. 137/596, 637.2; 192/12 C, 13 R

[56] References Cited

U.S. PATENT DOCUMENTS

4,093,048  6/1978  Hakes et al. ................. 192/13 R
4,310,027  1/1982  Weirich ......................... 137/637.2
4,336,869  6/1982  Tsutsumi ....................... 192/13 R Primary Examiner—Gerald A. Michalsky
Attorney, Agent, or Firm—Armstrong, Nikaido Marmelstein & Kubovcik

[57] ABSTRACT

A steering control valve system for a crawler vehicle has four valve spool bores formed in parallel to each other at equal intervals in a valve body, four valve spools respectively inserted slidably into the four valve bores, four actuator members respectively inserted slidably into the four valve bores so as to respectively actuate the four valve spools, and a link mechanism for operatively connecting between the four actuator members and operating mediators, wherein the valve system is controlled by only a push-in operation of the valve spools. The operating mediators are steering levers and a brake pedal or electric motors and operating buttons.

4 Claims, 15 Drawing Figures

STEERING CONTROL VALVE SYSTEM FOR CRAWLER VEHICLE

BACKGROUND OF THE INVENTION

1. Field of the invention

The present invention relates to the control of a steering clutch and a steering brake in a crawler vehicle, and more particularly to a hydraulic-actuated steering control valve system for controlling those steering clutch and steering brake.

2. Description of the prior art

The steering control in a crawler vehicle (hereinafter referred to simply as "tractor") is performed by interrupting the drive for a driving wheel or sprocket on one side (left side) or the other side (right side) of the tractor, and its function is promoted by applying the brake to one of drive elements or any of the others.

As one system for actually performing the aforementioned steering control, a steering control system provided with a wet, multiple disc type clutch and brake has heretofore been used. Both these clutch and brake are so constructed as to be brought into an engaged state by a spring force and into a disengaged state by overcoming the spring force with a hydraulic force. Therefore, the provision of an oil pressure gradually increasing valve for the clutch and an oil pressure gradually decreasing valve for the brake may be one method for bringing the clutch and the brake into the half-engaged or half-released states, respectively. In this case, for independent steering operations on both sides (left and right) of the tractor, it is necessary to provide four valves (spools).

As a valve system of this type, there is a hydraulic-actuated steering control valve system 46 which is disclosed in U.S. Pat. No. 4,093,048. The control valve system 46 is provided with two juxtaposed control valve portions 54 and 58. In a valve bore 70 of one control valve portion are disposed in series a clutch control valve spool 72, a brake control valve spool 106 and an actuator means 160 interposed between these two valve spools. Further, in order to ensure the braking function, a foot brake dedicated control valve is disposed in parallel between the aforementioned two control valve portions or in another place. Therefore, the structure of the entire system inevitably becomes relatively large and complicated.

As a control system which does not lose the steering function required of the tractor and which is simple in structure and relatively small in size, the present applicant has developed a hydraulic control valve system which is disclosed in U.S. Pat. No. 4,336,869. According to this system, three valve bores are formed in parallel in one valve body, and in each of those valve bores are inserted a brake dedicated valve spool, a left-hand steering valve spool and a right-hand steering valve spool. Actuator means for operating these spools are attached to one end sides of the spools.

The control valve system disclosed in the above U.S. Pat. No. 4,336,869 suffices for attaining the ordinary steering function in the tractor. However, for enlarging the working range of the tractor, the conventional steering function is not always sufficient. For example, when the tractor descends a steep slope while towing a heavy load, it will not follow the operator's intention if the ordinary steering operation is applied. In this case, it is necessary that left and right brakes be operated each independently in addition to an intermittent operation of left and right clutches. (This operation will hereinafter be referred to as "single-acting operation".) In other words, a steering control system capable of operating the left and right clutches and the left and right brakes each independently is required. On the other hand, once the steering function of the tractor is let suit such a special work as mentioned above, the number of so-called operating parts such as operating lever and foot brake pedal is increased in the steering operation in ordinary works, thus resulting in that the operation becomes complicated. This is inconvenient. In ordinary tractor works, therefore, it is required to effect a so-called interlocking operation whereby a clutch and a brake are combined and operated simultaneously.

SUMMARY OF THE INVENTION

The present invention has been accomplished in view of the above-mentioned circumstances. It is a primary object thereof to provide a steering control valve system which, in a single tractor, can easily effect switching from the interlocking operation to the single-acting operation (or vice versa) with respect to clutch and brake.

It is another object of the present invention to provide a steering control valve system which is simple in structure and easy to operate.

It is a further object of the present invention to provide a steering control valve system in which, without using a single valve spool for the operation of both clutch and brake, each valve spool is clearly distinguished its use, either for a clutch or for a brake, and those valve spools are disposed in parallel, thereby attaining a higher sureness and a more rapid response characteristic in connection with operation.

It is a still further object of the present invention to provide a steering control valve system in which various steering control functions can be obtained by only a push-in operation of valve spools.

It is still another object of the present invention to provide a steering control valve system which can easily effect switching from a mechanical operation to an electric operation (or verce versa).

In accordance with the present invention, there is provided a steering control valve system for a crawler vehicle comprising: one valve body; four valve bores formed in said valve body in parallel at substantially equal intervals so as to constitute clutch valves and brake valves on both left and right sides of the vehicle, said four valve bores being a left-hand clutch valve dedicated bore formed on one side of the valve body, a right-hand clutch valve dedicated bore formed on the other side of the valve body, a left-hand brake valve dedicated bore formed in a position close to the center of the valve body and also close to said left-hand clutch valve dedicated bore, and a right-hand brake valve dedicated bore formed close to the center of the valve body and also close to said right-hand clutch valve dedicated bore; four valve spools respectively inserted slidably into said four valve bores, said four valve spools being a left-hand clutch valve spool, a right-hand clutch valve spool, a left-hand brake valve spool and a right-hand brake valve spool; and four actuator members respectively inserted slidably into said valve bores so as to operate said four valve spools; and further comprising a link mechanism for operatively connecting between said four actuator members and two left- and right-hand steering levers as well as a brake pedal so as to selectively operate said four actuator members, wherein said valves are controlled by only a push-in operation of said valve spools.

Further, in accordance with the present invention, there is provided a steering control valve system in which both said left-and right-hand brake valve dedicated bores are of a two-stage structure having a difference in inside diameter, in which two-stage structure the bore inside diameter present between an inlet port for hydraulic oil from a hydraulic power source and an outlet port positioned on the side opposite to said actuator members with respect to said inlet port and communicating with a brake is formed smaller than the bore inside diameter present between said outlet port and a drain port positioned farther than said outlet port on the side opposite to said actuator members, and in which said left- and right-hand brake valve spools are also formed in a two-stage structure having a difference in outside diameter corresponding to said two-stage bore, whereby the brake oil pressure is reduced in proportion to an increase in stroke of each said brake valve spool induced by each said actuator member.

Further, in accordance with the present invention, there is provided a steering control valve system, wherein said link mechanism has a left-hand steering link means capable of operating the actuator member of a left-hand brake valve and the actuator member of a left-hand clutch valve simultaneously interlockedly; a right-hand steering link means capable of operating the actuator member of a right-hand brake valve and the actuator member of a right-hand clutch valve simultaneously interlockedly; and a brake link means capable of operating the actuator members of the left- and right-hand brake valves simultaneously interlockedly.

Further, in accordance with the present invention, there is provided a steering control valve system, wherein said link mechanism has left- and right-hand brake dedicated link means for operating the actuator members of the left- and right-hand brake valves each independently, and left- and right-hand steering dedicated link means for operating the actuator members of the left- and right-hand clutch valves each independently.

Still further, in accordance with the present invention, there is provided a steering control valve system, wherein said link mechanism comprises an electric operation mechanism including electric motors which are provided respectively in corresponding relation to said actuator members.

DETAILED DESCRIPTION OF THE PREFERRED EMBODIMENTS

The present invention will be described more in detail hereinunder on the basis of embodiments thereof illustrated in the accompanying drawings.

Figure 1:
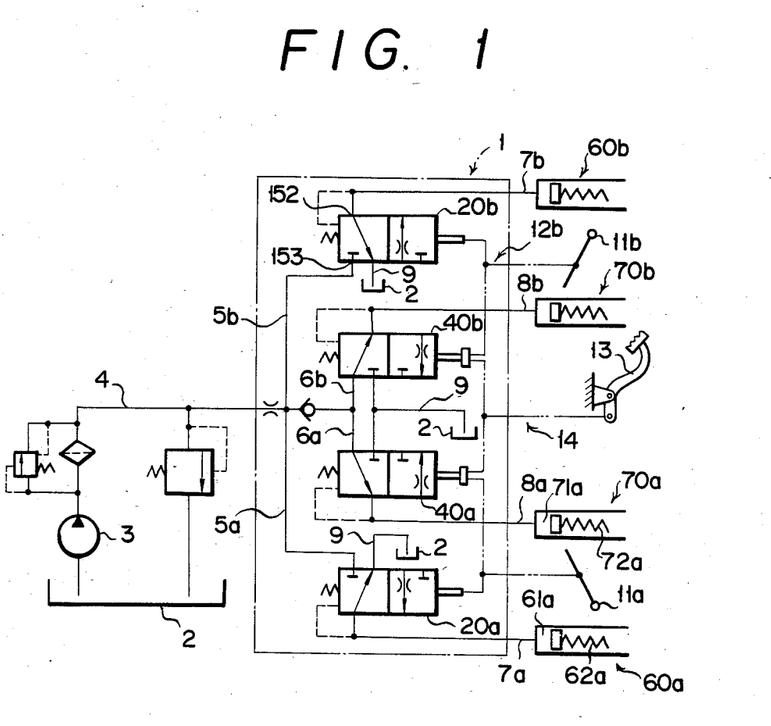
FIG. 1 is a schematic diagram showing an example of a hydraulic circuit associated with the steering control valve system of the present invention and a steering system of a tractor.

FIG. 1 is a view showing an example of a hydraulic circuit associated with the steering control valve system of the present invention and a steering system of a tractor, in which figure the portion surrounded by an alternate long and short dash line and schematically shown with the reference numeral 1 is the steering control valve system of the present invention. The numeral 2 denotes an oil tank. The steering control valve system 1 is provided with four juxtaposed valves which are a left-hand clutch dedicated valve 20a (hereinafter referred to simply as "left-hand clutch valve 20a") connected to a left-hand sprocket clutch (hereinafter referred to simply as "left-hand clutch") 60a, a right hand clutch dedicated valve 20b (hereinafter referred to simply as "right-hand clutch valve 20b") connected to a right-hand sprocket clutch (hereinafter referred to simply as "right-hand clutch") 60b, a left-hand brake didicated valve 40a connected to a left-hand brake 70a, and a right-hand brake dedicated valve 40b connected to a right-hand brake 70b. To these valves is fed an operating oil from the oil tank 2 through feed pipes 4, 5a, 5b, 6a and 6b by the action of a pump 3. Further, through these valves and then through pipes 7a, 7b, 8a and 8b, the operating oil is fed selectively to the left- and right-hand clutches and left- and right-hand brakes to effect a steering control for the tractor. In FIG. 1, the numeral 9 denotes a drain pipe, and numeral 11a denotes a left-hand steering lever for operating the left-hand clutch valve 20a and left-hand brake valve 40 interlockedly through a first link mechanism 12a, while numeral 11b denotes a right-hand steering lever for operating the right-hand clutch valve 20b and right-hand brake valve 40b interlockedly through a second link mechanism 12b. Further, in the same figure, numeral 13 denotes a brake pedal for operating the left- and right-hand brake valve 40a and 40b interlockedly through a third link mechanism 14.

Figure 2:
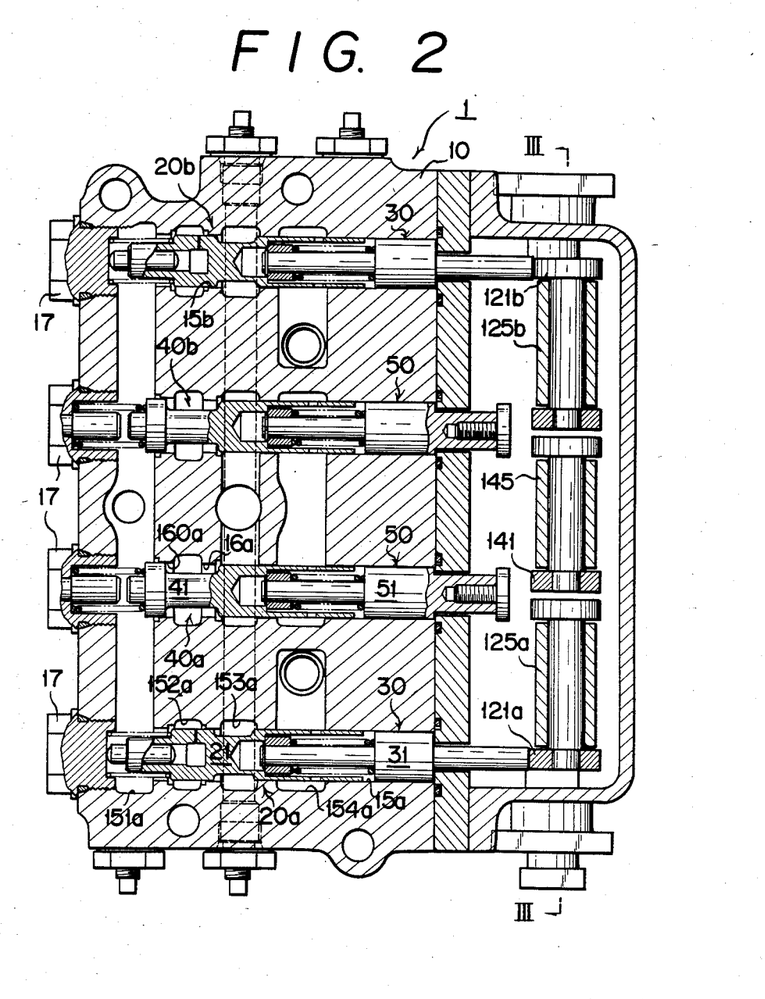
FIG. 2 is an entire transverse sectional view showing an embodiment of the steering control valve system of the present invention.

The details of an embodiment of the present invention concerning the steering control valve system 1 are shown in FIG. 2.

As shown in FIG. 2, in a valve body 10 are formed four valve bores in parallel at substantially equal intervals, which valve bores are a left-hand clutch valve dedicated bore 15a formed on one side of the valve body 10, a right-hand clutch valve dedicated bore 15b formed on the other side of the valve body 10, a left-hand brake valve dedicated bore 16a formed in a position close to the center of the valve body 10 and also close to the bore 15a, and a right-hand brake valve dedicated bore 16b formed in a position close to the center of the valve body 10 and also close to the bore 15b. One end sides of these valve bores are closed in a liquid-tight state by cap members 17. Within each valve bore are disposed, successively from the inside, a valve spool and actuator members 30, 50 a part of which projects at the other side of the valve bore and contacts a link mechanism so as to actuate the valve spool.

In FIG. 2, the rightmost members are portions of the link mechanisms for operatively connecting the steering levers and the brake pedal with the valve actuator members 30, 50. The numeral 121a denotes a first pressing member as a terminal member of the first link mechanism 12a. The first pressing member 121a presses the actuator members 30, 50 of the left-hand clutch valve 20a and left-hand brake valve 40a according to the operation of the left-hand steering lever 11a. The numeral 121b denotes a second pressing member as a terminal member of the second link mechanism 12b. The second pressing member 121b presses the actuator members 30, 50 of the right-hand clutch valve 20b and right-hand brake valve 40b according to the operation of the right-hand steering lever 11b. Further, the numeral 141 denotes a third pressing member as a terminal member of the third link mechanism 14. The third pressing member 141, which is disposed between the first and second pressing members as shown in the figure, presses the actuator members 30, 50 of the left- and right-hand brake valves 40a and 40b according to the operation of the brake pedal. If both ends of each pressing member are formed in the shape of a roller, such a shape is suitable for the pressing operation.

Figure 3:
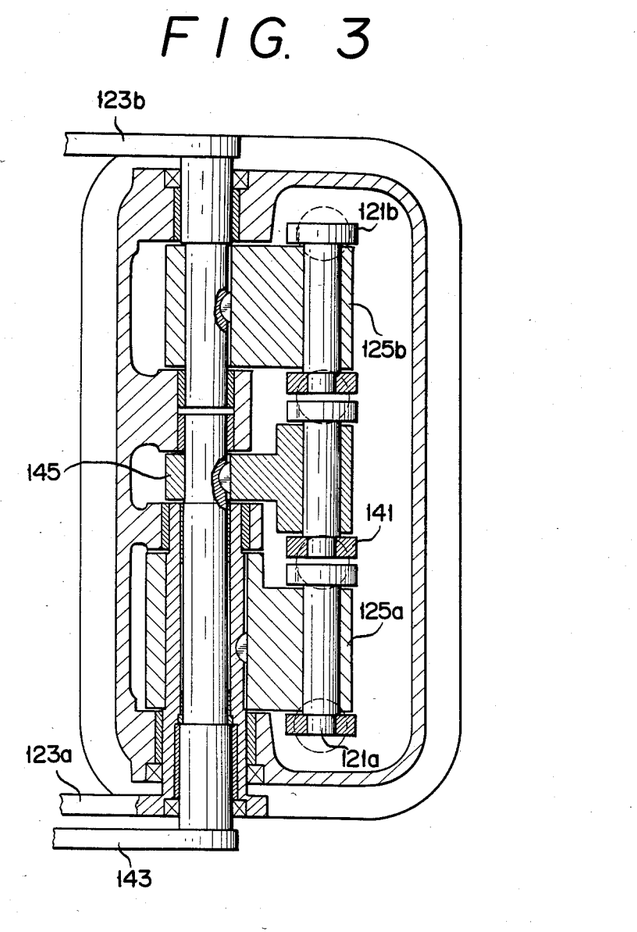
FIG. 3 is a partially cut-away longitudinal sectional view showing a link mechanism in the case of interlocking operation of the steering control valve system of the present invention.

FIG. 3 is a partially sectional view taken along line III—III in FIG. 2. Each link mechanism will now be explained in detail with reference to FIG. 3. The numeral 123a denote an L-shaped, left-hand steering lever dedicated link member (hereinafter referred to simply as "left-hand steering link member") connected to the left-hand steering lever 11a. The left-hand steering link member 123a is connected to the first pressing member 121a through a first connecting member 125a. One side of the L form of the link member 123a connected to the first pressing member 121a is hollowed. Further, a right-hand steering lever dedicated link member (hereinafter referred to simply as "right-hand steering link member") 123b connected to the right-hand steering lever 11b is disposed in an opposed relation to the left-hand steering link member 123a. The right-hand steering link member 123b, which is inverted L-shaped, is connected to the second pressing member 121b through a second connecting member 125b. A brake pedal dedicated link member (hereinafter referred to simply as "brake link member") 143 for transmitting the operation of the brake pedal 13 to the third pressing portion 141 is formed in the shape of L, and its perpendicularly bent terminal portion is inserted pivotably into the hollow portion of the left-hand steering link member 123a and projected to the space between the left- and right-hand steering link members 123a and 123b, and in this projecting portion it engages a third connecting member 145 which connects the brake link member 143 with the third pressing member 141.

In the embodiment illustrated in FIGS. 1 through 3, the system is constructed so that the left-hand clutch valve and the left-hand brake valve, or the right-hand clutch valve and the right-hand brake valve, or both the left- and right-hand brake valves, are respectively operated interlockedly. In the steering operation in ordinary works of the tractor, such interlockable construction is convenient because the number of operating parts is decreased. But when the tractor is used for a special work, for example, when it descends a steep slope while towing a heavy load, it is necessary that the left- and right-hand clutches and brakes be operated each independently. In such a case, the present invention is constructed so that, with respect to a single tractor, the steering control valve system for ordinary works can be easily switched to the steering control valve system for special works (or vice versa). This switching is attained by a mere replacement of link mechanism without replacement of the entire system.

More specifically, this single-acting operation will be explained below in connection with an example shown in FIG. 4.

Figure 4:
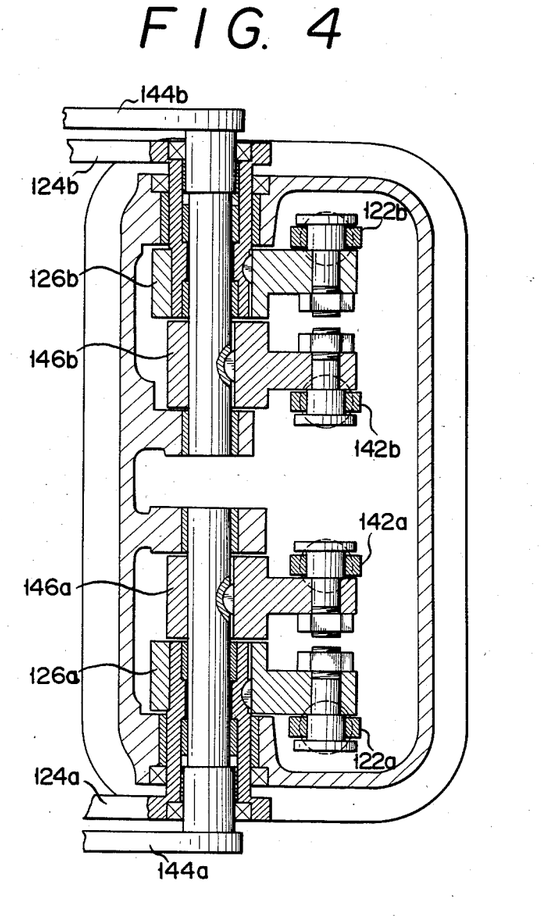
FIG. 4 is a partially cut-away longitudinal sectional view showing a link mechanism in the case of single-acting operation of the steering control valve system of the present invention.

In FIG. 4, the link mechanisms are completely independent of one another so that the actuator members of the foregoing four valves are operated each independently by the respective associated pressing members. A left-hand clutch valve dedicated pressing member 122a for pressing the actuator member of the left-hand clutch valve is connected through a fourth connecting member 126a to a left-hand steering link member 124a having a hollow portion. On the other hand, a right-hand clutch valve dedicated pressing member 122b for pressing the actuator member of the right-hand clutch valves connected through a fifth connecting member 126b to a right-hand steering link member 124b having a hollow portion. Further, a left-hand brake valve dedicated pressing member 142a for pressing the actuator member of the left-hand brake valve is connected through a sixth link member 146a to the fore end portion of a left-hand brake link member projecting through the hollow portion of the left-hand steering link member. On the other hand, a right-hand brake valve dedicated pressing member 142b for pressing the actuator member of the right-hand brake valve is connected through a seventh link member 146b to the fore end portion of a right-hand brake link member projecting through the hollow portion of the right-hand steering link member. Like the example shown in FIG. 3, the link members just described above have an L form or the corresponding inverted L form.

As will be apparent from the above, in the case of the system for single-acting operation, the brakes and clutches are separated, and also with respect to the brakes, the left- and right-hand brakes are separated from each other. Therefore, two brake pedals are provided respectively for the left- and right-hand brakes. Thus, if two brake pedals are provided in one tractor, the interlocking-single acting switching can be done easily by a mere replacement of link mechanism as previously noted.

Figure 5A:
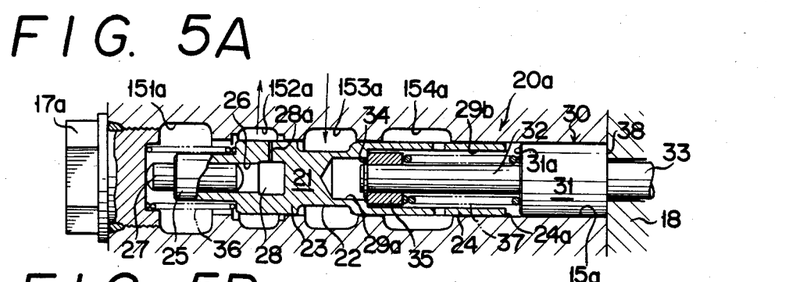
FIGS. 5A to 5D are partially cut-away enlarged sectional views for explaining the operation of a clutch valve as a steering control valve in the present invention.
Figure 6A:
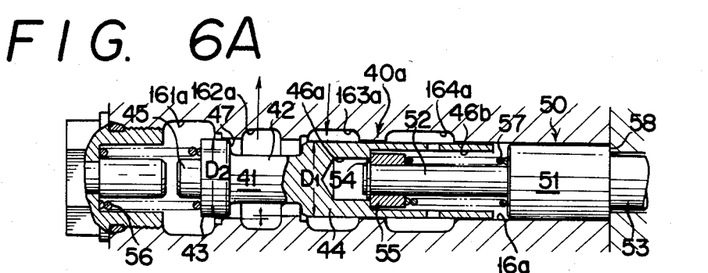
FIGS. 6a to 6D are partially cut-away enlarged sectional views for explaining the operation of a brake valve as a steering control valve in the present invention.

The structure of clutch valve and that of brake valve will be described below more in detail with reference to FIGS. 5A and 6A. But, all the following explanations will concern the left-hand valves and the explanation on the right-hand valves will be omitted because the explanation on both left- and right-hand valves would be tautologized.

First, an example of the clutch valve used in the present invention will be explained with reference to FIG. 5A. The valve bore 15a formed in the valve body 10 has ports in four places as shown in the figure, which ports are, successively from the left side (the side closer to the cap member 17) in the figure, a first drain port 151a, an outlet port 152a communicating with a left-hand clutch pressure oil chamber 61a, an inlet port 153a communicating with the pump 3, and a second drain port 154a. In the valve bore 15a are slidably inserted in series a clutch valve spool 21 and a clutch valve actuator member 30 successively from the left side in the figure. The clutch valve spool 21 has a small-diameter portion 22 at a substantially central part thereof, a first land portion 23 on the left side of the small-diameter portion and a second land portion 24 on the right side. A stepped portion 25 of a small diameter is formed at one end portion of the spool projecting from the left side of the first land portion 23. In the interior portion of the spool from the stepped portion 25 to the first land portion there is formed a first small-diameter hole 26. Into the hole 26 is inserted a reaction piston (lug) 27 slidably in a liquid-tight state, and a pressure chamber 28 is formed thereby. In the pressure chamber 28 is formed a small communication hole 28a communicating with the outlet port 152a. In the interior portion from the second land portion 24 to the small-diameter portion 22 there are formed a hole 29a of a small diameter and a hole 29b of a somewhat larger diameter stepwise in series. In the figure, the actuator member 30 positioned on the right side of the spool 21 comprises a large-diameter portion 31 which is in sliding contact with the valve bore 15a, and a first small-diameter portion 32 extending from the left side of the large-diameter portion to one end side of the actuator member. The opposite side (right side) of the actuator member 30 is in abutment with a rod 33. A stopper member 35 having a diameter larger than that of the hole 29a and smaller than that of the hole 29b is mounted on the tip end portion of the first small-diameter portion 32 through a snap ring 34 which is provided in a position closer to the tip end of the first small-diameter portion than the stopper member. Between the cap member 17 and the first land portion 23 is disposed a first resilient spring 36 so that it surrounds the stepped portion 25, whereby the spool 21 is urged to the right in the figure. On the other hand, between the stopper member 35 provided at one end of the actuator member 30 and the substantially centrally positioned large-diameter portion 31 is disposed a second resilient spring 37 so that it surrounds the first small-diameter portion 32. If the spring force of the first resilient spring 36 is $w_1$ and that of the second resilient spring 37 is $w_2$, the relation of the two is preset as follows:

$$w_1 < w_2 \quad (1)$$

Therefore, when the operator's operating force is not exerted on the left-hand steering lever 11a, the spool 21 is biased by the action of the second resilient spring 37 to the left in the figure up to the position balancing with the action of the first resilient spring 36, whereby the communication between the inlet port 153a and the outlet port 152a is cut off as shown in the figure. On the other hand, the actuator member 30 is biased to the right so that an end face 38 of the large-diameter portion 31 contacts a side plate 18 of the valve body 10.

Assuming that the oil pressure from the pump acts on the outlet port 152a and there is no drain, a hydraulic pressure $F_1$ corresponding to the oil pressure multiplied by the pressure receiving area is generated in the pressure chamber 28 in the spool 21 through the communication hole 28a. The hydraulic force $F_1$ is obtained by the following equation:

$$F_1 = q_2 - w_1 \quad (2)$$

From the above relation, if the spring force $w_1$ of the first resilient spring 36 is assumed to be constant, the hydraulic force $F_1$ of the pressure chamber 28 increases in proportion to the increase of the spring force $w_2$ of the second resilient spring 37. More specifically, once the stroke of the spool 21 which varies according to the operation of the steering lever 11a by the operator is advanced up to a predetermined length, the spring force $w_2$ of the second resilient spring 37 so much increases and the hydraulic force $F_1$ also increases in proportion thereto. At the stage where the operation stroke exceeds the length, the spring force $w_2$ of the second resilient spring 37 reaches the maximum value and the internal pressure of the pressure chamber 28 becomes coincident with the discharge pressure of the pump 3 like the output port 152a.

An example of the brake valve of the present invention will now be explained with reference to FIG. 6A. Like the clutch valve, the valve bore 16a formed in the valve body 10 has ports in four places, which ports are, successively from the left side (the side closer to the cap member 17), a first drain port 161a, an outlet port 162a communicating with a left-hand brake pressure oil chamber 71a, an inlet port 163a communicating with the pump 3, and a second drain port 164a. In the valve bore 16a are inserted slidably in series a brake valve spool 41 and a brake valve actuator member 50 successively from the left side in the figure. The brake valve spool 41 has a small-diameter portion 42 formed at an intermediate portion thereof, a first land portion 43 formed on the left side of the small-diameter portion and a second land portion 44 on the right side of the small-diameter portion. Between these first and second land portions there is a predetermined difference in diameter. More specifically, if the diameter of the first land portion 43 and that of the second land member 44 are $D_2$ and $D_1$, respectively, there exists the following relationship:

$$D_2 < D_1 \quad (3)$$

In this connection, the left-hand portion (in the figure) of the valve bore 16a with respect to the outlet port 162a also has a diameter corresponding to $D_2$, and the right-hand portion thereof has a diameter corresponding to $d_1$. The end portion of the spool extending from the left side of the first land portion 43 is formed with a stepped portion 45 of a small diameter. In the interior of the second land portion 44, a hole 46a of a small diameter and a hole 46b of a somewhat larger diameter are formed stepwise in series. In the figure, the actuator member 50 positioned on the right side of the spool 41 comprises a large-diameter portion 51 which is in sliding contact with the valve bore 16a, and a small diameter portion 52 extending from the left side of the large diameter portion to one end side of the actuator member. The opposite side (right side) of the actuator member 50 is in abutment with a rod 53. A stopper member 55 having a diameter larger than that of the hole 46a and smaller than that of the hole 46b is mounted on the tip end portion of the first small-diameter portion 52 through a snap ring 54 which is provided in a position closer to the tip end of the first small-diameter portion than the stopper member. Between the cap member 17 and the first land member 43 is disposed a first resilient spring 56 so that it surrounds the stepped portion 45, whereby the spool 41 is urged to the right in the figure. On the other hand, between the stopper member 55 provided at one end of the actuator member 50 and the large-diameter portion 51 there is disposed a second resilient spring 57 so that it surrounds the first small-diameter portion 52.

If the spring force of the first resilient spring 56 is $W_1$ and that of the second resilient spring is $W_2$, the relation of the two is preset as follows:

$$W_1 > W_2 \qquad (4)$$

Therefore, when the operator's operating force is not exerted on the brake pedal 13, the spool 41 is biased by the action of the first resilient spring 57 to the right in the figure up to the position balancing with the action of the second resilient spring 57. As shown in the figure, moreover, the inlet port 163a and the outlet port 162a are communicated with each other, and the pump oil pressure acts on the brake against the force of a brake actuating spring 72a, so that the brake is released. On the other hand, the actuator member 50 is biased to the right so that an end face 58 of the large-diameter portion 51 contacts the valve side plate 18.

If the axial pressure exhibited when the feed oil pressure from the pump 3 acts on the first land portion 43 is $F_2$, there exists the following relationship:

$$F_2 = W_1 - W_2 \qquad (5)$$

provided $F_2 = \pi/4(D_1^2 - D_2^2) \cdot P$ where P represents oil pressure.

In the equation (5), if the spring force $W_1$ of the first resilient spring 56 is constant, the axial force $F_2$ decreases in inverse proportion to the increase of the spring force $W_2$ of the second resilient spring 57. More specifically, once the stroke of the spool 41 which varies according to the depression L of the brake pedal 13 by the operator is advanced up to a predetermined length, the spring force $W_2$ of the second resilient spring 57 so much increases and the axial force $F_2$ decreases in inverse proportion thereto.

Figure 6B:
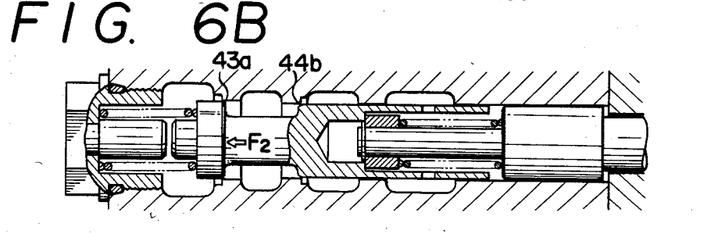
Figure 6C:
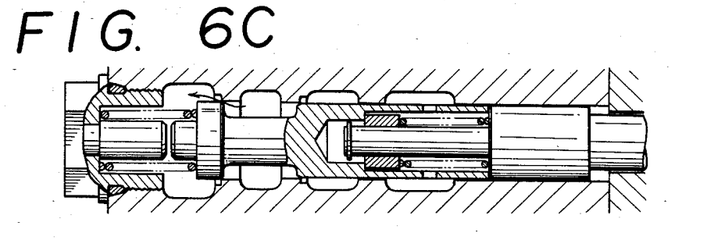
Figure 6D:
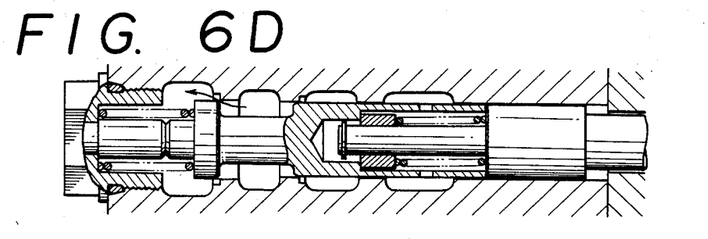
Figure 7A:
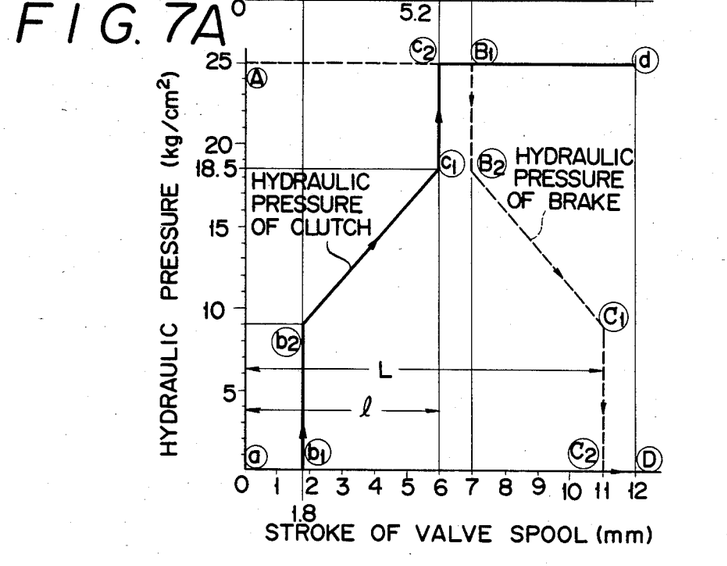
FIGS. 7A and 7B are diagrams respectively showing the relationship between the strokes of the spools of clutch valve and brake valve and oil pressure (FIG. 7A) and the relationship between strokes of the spools and spool thrust (FIG. 7B)
Figure 7B:
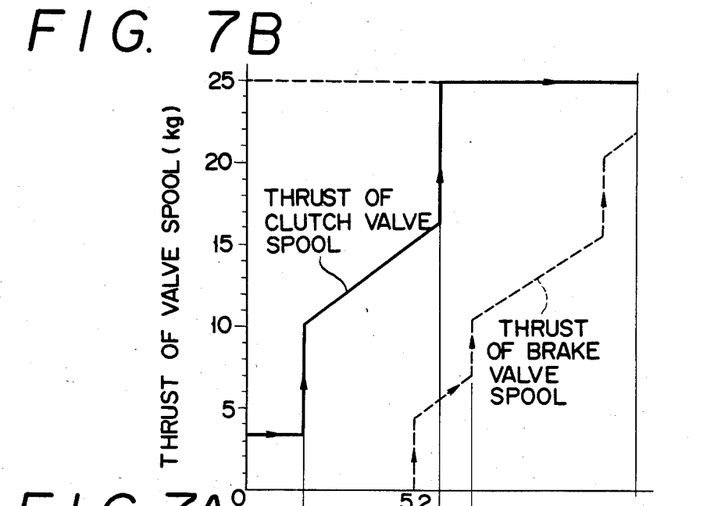

In FIGS. 7A and 7B there are diagrammatically shown the relationship between the strokes of the spools of clutch valve and brake valve and the hydraulic force (FIG. 7A), and the relationship between the strokes of the spools of clutch valve and brake valve and the spool thrust (FIG. 7B), in the steering control valve system of the present invention. Explanation of these figures will be given later in the explanation of operation of the system of the present invention taken in connection with FIGS. 5A to 5D and 6A to 6D.

Figure 8:
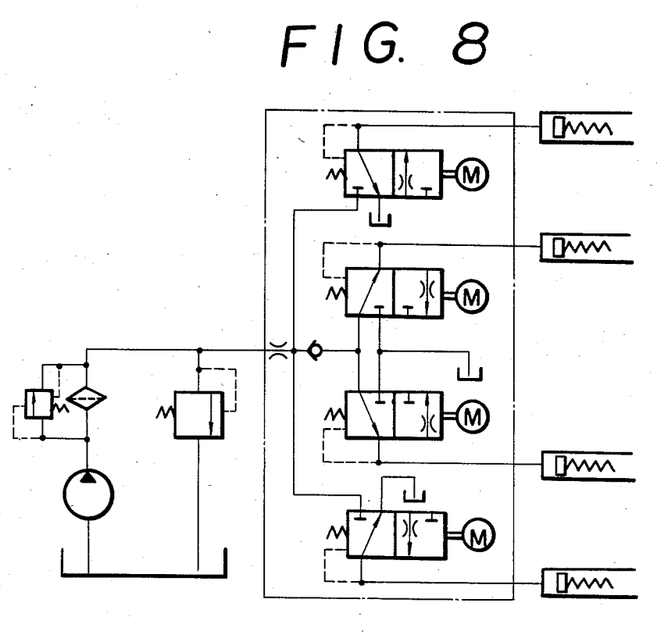
FIG. 8 is a schematic diagram showing an example of a hydraulic circuit associated with the steering control valve system of the present invention and a steering system of a tractor in the case of using electric motors in place of the mechanical link mechanism.

FIG. 8 is a circuit diagram showing another example of a hydraulic circuit in the present invention, in which the valves are actuated by electric motors M which are provided correspondingly to the actuator members of the valves. These electric motors M are operated selectively by operating means, e.g. operating buttons, which are provided separately.

In the present invention, the switching from the interlocking operation mechanism to the single-acting operation mechanism is easily attained by only change of link mechanism, as previously noted. Likewise, the switching from the mechanical link mechanism to the electric operation mechanism referred to above (or vice versa) can also be effected easily.

The operation of the system of the present invention will be explained below with reference to FIGS. 5A to 5D, 6A to 6D, 7A and 7B. Also in this case, only the left-hand clutch valve 20a and brake valve 40a will be explained and the explanation of the right-hand ones will be omitted.

First, the operation of the clutch valve 20a will be explained with reference to FIGS. 5A to 5D, 7A and 7B. When the steering lever 11a is not operated and the spool 21 is neutral (the state of FIG. 5A), the operating oil fed from the pump 3 through the feed pipes 4 and 5a flows into the inlet port 153a. At this time, since the communication between the inlet port 153a and the outlet port 152a is completely cut off by the first land portion 23, the operating oil in the inlet port 153a does not flow downstream. On the other hand, the outlet port 152a communicating with the pressure oil chamber 61a of the clutch 60a is in communication with the first drain port 151a (ⓐ in FIG. 7A), so that the clutch 60a is held in a completely engaged state by the action of a clutch operating spring 62a.

Figure 5B:
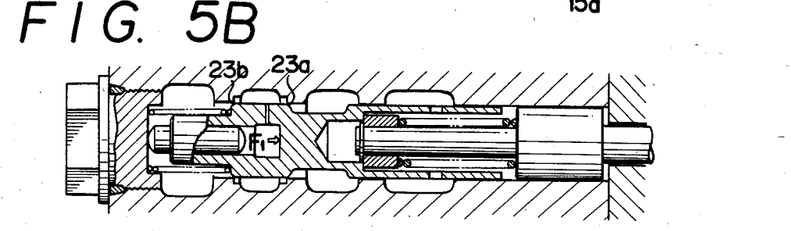

Then, if the steering lever 11a is operated and the clutch valve spool 21 is thereby pushed in by a certain length (for example, 1.8 mm as shown) as illustrated in FIG. 5B, there is formed a slight gap between a shoulder portion 23a of the first land portion 23 on the side of the inlet port 153a and the outlet port 152a, while a shoulder portion 23b of the first land portion 23 on the outlet port side cuts off the communication between the outlet port 152a and the first drain port 151a. As a result, the operating oil is fed to the pressure oil chamber 61a of the clutch 60a and a predetermined pressure (for example, 9.0 kg/cm² as shown in FIG. 7A) is produced in the hydraulic circuit from the pressure oil chamber 61a to the outlet port 152a. (b₁~b₂ in FIG. 7A) At this time, since oil pressure is generated in the pressure oil chamber 61a, the clutch 60a begins to transfer from the completely engaged state to a half-engaged (so-called half-clutch) state.

If the steering lever 11a is operated further from the state shown in FIG. 5B and the spool 21 is thereby pushed in to a further extent, the spring force w₂ of the second resilient spring 37 increases. As a result, as previously explained in connection with the equation (1), the pressure in the pressure chamber 28, namely, the pressure in the circuit from the outlet port 152a to the pressure oil chamber 61a of the clutch, increases gradually up to a certain value (for example 18.5 kg/cm² as shown in FIG. 7A) in proportion to the increase of w₂, namely, the increase in stroke of the spool 21. (ⓑ₂ ~ ⓒ₁ in FIG. 7A) That is, the operating oil in the outlet port 152a flows through the communication hole 28a into the pressure chamber 28 and acts to push the spool 21 back to the right in the figure. Thus, the clutch valve 20a has the function as a gradually intensifying valve which holds a balanced state of the hydraulic force in the pressure chamber 28 with the spring force w₂ of the second resilient spring 37. During such a gradual pressure increase in the clutch pressure oil chamber 61a of the clutch, the clutch 60a continues to assume the half-engaged state.

Figure 5C:
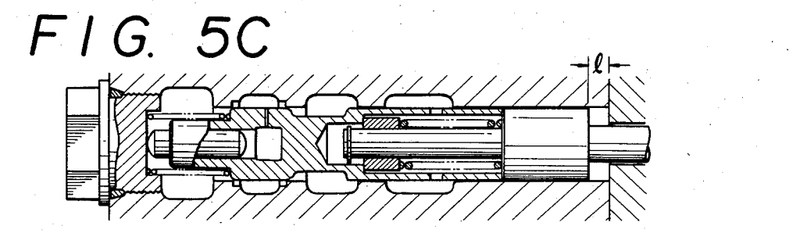

When the spool 21 is further pushed in and its stroke reaches a certain length (for example, 6 mm as shown) as illustrated in FIG. 5C, an end face 24a of the second land portion 24 and an end face 31a of the large-diameter portion 31 opposed thereto come into abutment with each other, so that the spool is no longer pushed back to the right. Consequently, the inlet port 153a and the outlet port 152a come into communication with each other. On the other hand, since the first drain port 151a is completely closed by the first land portion 23, the pressure of the pressure oil chamber 61a of the clutch becomes the same as the pump pressure (for example, relief pressure of 25 kg/cm² as shown in FIG. 7A) ($C_1$ ~ $C_2$ in FIG. 7A) In this state, the clutch 60a is completely disengaged.

Figure 5D:
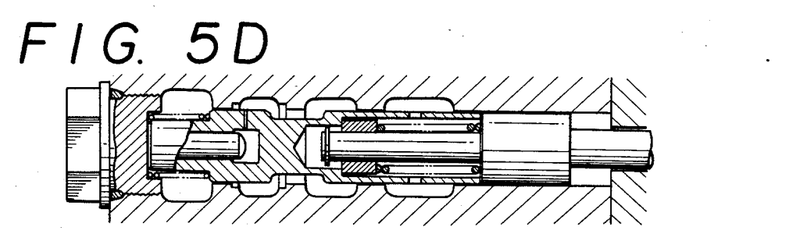

Thereafter, the oil pressure does not change at the pump pressure and the clutch 60a remains disengaged until the steering lever 11a is operated and the spool 21 reaches its stroke end (for example, 12 mm as shown) as illustrated in FIG. 5D. ($c_2$ ~ $d$ in FIG. 7A)

The operation of the brake valve 40a will be described below with reference to FIGS. 6A to 6D, 7A and 7B.

When the brake pedal 13 is not operated and the brake valve spool 41 is neutral (the state of FIG. 6A), the operating oil fed from the pump 3 through the feed pipes 4 and 6a flows into the inlet port 163a. At this time, since the inlet port 163a and the outlet port 162a are in communication with each other, the operating oil flows form the outlet port 162a into the pressure oil chamber 71a of the brake through the pipe 8a. The hydraulic force of the pressure oil chamber 71a of the brake is equal to the pump oil pressure because there is no drain in the hydraulic circuit described above. (Position in $A$ FIG. 7A) At this time, the brake 70a is released because the hydraulic force is exerted thereon against the spring force of the brake actuating spring 72a.

If the brake pedal 13 is operated from this state and the brake valve spool 41 is thereby pushed in by a certain length (for example, 7 mm as shown) as illustrated in FIG. 6B, the communication between the inlet port 163a and the outlet port 162a is temporarily cut off by a shoulder portion 44b which faces the outlet port 162a of the second land portion 44. On the other hand, a shoulder portion 43a of the first land portion 43 on the side of the outlet port 162a is placed in a position permitting a slight temporary communication between the outlet port 162a and the first drain port 161a. As a result, the oil pressure in the circuit from the pressure oil chamber 71a of the brake to the outlet port 162a drops to a certain value (for example, 18.5 kg/cm² as shown in FIG. 7A) ($B_1$ ~ $B_2$ in FIG. 7A) At this time, the brake 70a begins to transfer from the completely released state to an incompletely released state (so-called half-brake state).

Then, if the spool 41 is further pushed in by operation of the brake pedal, the spring force $W_2$ of the second resilient spring 57 increases. As a result, as previously explained in connection with the equation (5), the oil pressure of the pressure oil chamber of the brake, namely, the oil pressure of the outlet port 162a, gradually decreases to a certain value (for example, 9.0 kg/cm² as shown in FIG. 7A) in inverse proportion to the increase of $W_2$, namely, the increase in the amount of strole of the spool 41. ($B_2$ ~ $C_1$ in FIG. 7A) During such a gradual decrease of the pressure in the brake pressure oil chamber 71a, the brake 70a continues to assume the half-actuated state.

If the spool 41 is further pushed in and its stroke reaches a certain length (for example, 11 mm as shown) as illustrated in FIG. 6C, the spring force $W_2$ of the second resilient spring 57 greatly increases and the communication between the inlet port 163 and the outlet port 162a is completely cut off by the shoulder portion 44b. On the other hand, the outlet port 162a and the first drain port 161a come into a complete communication with each other. As a result, the oil pressure in the brake pressure oil chamber 71a becomes zero from the drain pressure. ($C_1$ ~ $C_2$ in FIG. 7A) At the time, the brake 70a is completely actuated by the action of the brake actuating spring 72a.

Thereafter, the oil pressure in the brake pressure oil chamber 71a continues to be zero and the brake 70a remains completely actuated until the brake pedal 13 is further operated and the spool 41 reaches its stroke end (for example, 12 mm as shown) as illustrated in FIG. 6D. ($C_2$ ~ $D$ in FIG. 7A)

In common to FIGS. 7A and 7B, solid lines indicate clutch-related oil pressure and spool thrust, while dotted line indicate brake-related oil pressure and spool thrust.

As to actual steering operations for the tractor, in the case where the link mechanism is for interlocking operation, straight advance, gentle left turning, gentle right turning, sudden left turning and sudden right turning can be done as necessary by operation of the left- or right-hand steering lever 11a or 11b and/or operation of the brake pedal 13 which is common to both left and right sides. In the case where the link mechanism is for single-acting operation, an independent braking operation is performed on each of the left and right sides, so more complicated tractor steering operations can be attained.

As set forth hereinabove, the steering control valve system of the present invention has one valve body 10; four valve bores formed in the valve body 10 in parallel at substantially equal intervals so as to constitute clutch valves (20a, 20b) and brake valves (40a, 40b) on both left and right sides of the vehice, the four valve bores being a left-hand clutch valve dedicated bore 15a formed on one side of the valve body 10, a right-hand clutch valve dedicated bore 15b formed on the other side of the valve body 10, a left-hand brake valve dedicated bore 16a formed in a position close to the center of the valve body 10 and also close to the bore 15a, and a right-hand brake valve dedicated bore 16b formed close to the center of the valve body 10 and also close to the bore 15b; four valve spools respectively inserted slidably into the four valve bores, the four valve spools being a left-hand clutch valve spool 21a, a right-hand clutch valve spool 21b, a left-hand brake valve spool 41a and a right-hand brake valve spool 41b; and four actuator members (30a, 30b, 50a, 50b) respectively inserted slidably into the valve bores so as to operate the four valve spools; and further having a link mechanism for operatively connecting between the four actuator members and two left-and right-hand steering levers (11a, 11b) as well as a brake pedal 13 so as to selectively operate the four actuator members, in which the valves are controlled by only a push-in operation of the valve spools. Thus, the system of the present invention is simple in structure and easy to operate. Further, the switching from interlocking to single-acting operation (or vice verse) associated with clutch and brake can be easily attained by only the change of link mechanism.

We claim:

1. A steering control valve system for a crawler vehicle: comprising one valve body; four valve bores formed in said valve body in parallel at substantially equal intervals so as to constitute clutch valves and brake valves on both left and right sides of the vehicle, said four valve bores being a left-hand clutch valve dedicated bore formed on one side of the valve body, a right-hand clutch valve dedicated bore formed on the other side of the valve body, a left-hand brake valve dedicated bore formed in a position close to the center of the valve body and also close to said left-hand clutch valve dedicated bore, and a right-hand brake valve dedicated bore formed close to the center of the valve body and also close to said right-hand clutch valve dedicated bore; four valve spools respectively inserted slidably into said four valve bores, said four valve spools being a left-hand clutch valve spool, a right-hand clutch valve spool, a left-hand brake valve spool and a right-hand brake valve spool; and four actuator members respectively inserted slidably into said valve bores so as to operate said four valve spools; and further comprising a link mechanism for operatively connecting between said four actuator members and two left- and right-hand steering levers as well as a brake pedal so as to selectively operate said four actuator members, in which said valves are controlled by only a push-in operation of said valve spools.

2. A steering control valve system according to claim 1, wherein both said left- and right-hand brake valve dedicated bores are of a two-stage structure having a difference in inside diameter, in which two-stage structure the bore inside diameter present between an inlet port for hydraulic oil from a hydraulic power source and an outlet port positioned on the side opposite to said actuator members with respect to said inlet port and communicating with a brake is formed smaller than the bore inside diameter present between said outlet port and a drain port positioned farther than said outlet port on the side opposite to said actuator members, and wherein said left- and right-hand brake valve spools are also formed in a two-stage structure having a difference in outside diameter correspondingly to said two-stage bore, whereby the brake oil pressure is reduced in proportion to an increase in stroke of each said brake valve spool induced by each said actuator member.

3. A steering control valve system according to either claim 1 or claim 2, wherein said link mechanism has a left-hand steering link means capable of operating the actuator member of a left-hand brake valve and the actuator member of a left-hand clutch valve simultaneously interlockedly; a right-hand steering link means capable of operating the actuator member of a right-hand brake valve and the actuator member of a right-hand clutch valve simultaneously interlockedly; and a brake link means capable of operating the actuator members of the left- and right-hand brake valves simultaneously interlockedly.

4. A steering control valve system according to either claim 1 or claim 2, wherein said link mechanism has left- and right-hand brake dedicated link means for operating the actuator members of the left- and right-hand brake valves each independently, and left- and right-hand steering dedicated link means for operating the actuator members of the left- and right-hand clutch valves each independently.

* * * * *